Patented Jan. 20, 1942

2,270,444

UNITED STATES PATENT OFFICE 2,270,444

RECOVERY OF VANADIUM FROM VANADIUM BEARING MATERIALS

Leslie G. Jenness, Englewood, N. J., assignor, by mesne assignments, to Vanadium Corporation of America, New York, N. Y., a corporation of Delaware No Drawing. Application August 15, 1940, Serial No. 352,798

13 Claims. (Cl. 23—17)

This invention relates to the recovery of vanadium from vanadium bearing materials and more particularly to a process which is capable of being employed for economically recovering vanadium from materials containing small amounts thereof.

Vanadium occurs in various materials usually in small proportions and in complex chemical combinations. The present invention is capable of economically recovering vanadium from materials containing small amounts thereof, that is, materials containing from a fraction of 1 percent up to 3 percent, although obviously the process can be employed with advantage for high grade vanadium ores. Examples of materials capable of being treated by the present invention are carnotite ore, roscoelite ore, or slag from electric furnaces in which high grade vanadium ore has been employed to make ferrovanadium. Thus, the process is capable of economically recovering vanadium from the waste materials of processes requiring high grade vanadium ores as well as vanadium ores in general.

Extremely large amounts of vanadium bearing slags are now available in slag dumps and also large deposits of low grade vanadium ore are known in this country and elsewhere. The slags referred to as well as the low grade vanadium ores are complex mixtures usually containing, in addition to a small amount of vanadium, calcium, silicon, aluminum, manganese, and iron, as well as other materials. Certain of the ores may also contain uranium and radium. After roasting, the vanadium bearing materials can be considered for practical purposes as mixtures of and complex compounds of $CaO$, $SiO_2$, $V_2O_5$ and $R_2O_3$ where R includes manganese, aluminum and iron or similar metals such as chromium capable of forming oxides in which the metal is trivalent. Other alkaline earth metal oxides, such as barium oxide, may be present in small amounts but for purposes of the present invention will be considered as CaO. The composition of the chief compounds in the roasted material are unknown but are believed to be calcium silicates, complex silicates containing calcium silicates in combination with $R_2O_3$, as well as free silica and calcium oxide. The vanadium may be partly $V_2O_5$ in solid solution or in combination with these silicates or part of it may be present as calcium vanadates or in some cases, such as slag may be partly present in metallic form dispersed in the slag.

The major object of the present invention is to pretreat such vanadium bearing materials to convert increased amounts of the vanadium into extractible form while decreasing the amount of extraction reagent lost in the tails of the extraction process.

The preferred method of extracting vanadium is by the chlorination process of my Patent No. 1,834,622, granted December 1, 1931. This process includes the contacting of the vanadium bearing material with mixtures of gases containing essentially $SCl_2$ and $Cl_2$. By chlorinating the roasted ores at a proper temperature, for example, 350° C., the $SCl_2$ selectively extracts or reduces the vanadium from its compounds so that it can combine with the extraction gases to form vaporizable compounds, such as $VOCl_3$ or $VOCl_3.SCl_2$. These compounds are vaporized at the temperature given and are removed from the ore in vapor form. Other extraction processes may, however, be employed, such as leaching with a weak aqueous solution of a strong mineral acid, for example, with sulphuric acid or hydrochloric acid, or leaching with an alkali carbonate solution such as sodium carbonate. The chlorination extraction process has the advantage that practically pure vanadium is obtained when the vaporizable vanadium compounds are decomposed, while acid leaching or carbonate leaching may also extract other materials requiring extensive separation process for purifying the vanadium. However, by proper pretreatment in accordance with the present invention, a maximum amount of the vanadium can be put in extractible form and the material being extracted conditioned so that the amount of extraction reagent lost in the tails is made very low with any of the extraction processes. That is to say, as far as extraction of vanadium is concerned the results of the various extraction processes can be made practically equivalent by the present invention.

The present invention can be broadly stated as involving the making of proper additions, prior to roasting, of materials similar to those contained in the materials being treated to produce a chemical and physical balance rendering a maximum amount of vanadium extractible when the materials are properly roasted. When such a balance is achieved, it is also found that the amount of the extraction reagent lost is minimized.

Thus, at least three important factors cooperate to produce a treated vanadium bearing material of the types above mentioned in which a maximum amount of vanadium is rendered extractible. These factors are (1) a proper balance between the various oxides making up the complex compounds in the vanadium bearing materials, (2) a proper temperature of roasting of the materials, and (3) a proper incipient fusion point of the materials being roasted. All of these factors are interrelated since making additions to the ore to correct one of the factors will usually affect the others. This is particularly true of (1) and (3), as the proper temperature of roasting is very nearly constant for all of the materials and is varied only slightly, if at all, by additions to correct the chemical balance and incipient fusion point referred to. However, the point of incipient fusion must be carefully correlated with the roasting temperature for maximum results. It will be apparent that ore or slags may occasionally be found that need no adjustment for one or more of these factors but that, in general, the amount of vanadium recovered can be materially increased by making additions to the materials being treated, prior to roasting.

The temperature of roasting is an important consideration as the amount of extractible vanadium can be markedly increased by a proper roasting temperature even though the optimum balance of the oxides in the material being treated has not been produced. This temperature will vary somewhat with material being treated but is always in the neighborhood of 1800° F. Thus, temperatures much below 1700° F. are ordinarily too low to produce any substantial increase in vanadium extraction and temperatures much above 1900° F. will usually "kill" the material so as to actually decrease the amount of extractible vanadium. Such "killed" material may usually be restored, at least in part, by an annealing roast, that is, a roast in the neighborhood of 1800° F. for an extended period of time. Thus roasting should ordinarily be carried on within the range of 1700° to 1900° F. and for any given material a roasting operation at 1800° F. will produce close to the maximum result which maximum may easily be determined by varying slightly from 1800° F.

The time of roasting at the proper temperature is not particularly critical so long as sufficient time is provided to render extractible substantially all of the vanadium capable of being converted to extractible form. That is to say, vanadium recovery as a function of roasting time first increases rapidly, tapers off to a maximum and then slowly decreases. In general, two or three hours roasting is sufficient to render all of the vanadium extractible which is capable of being converted to extractible form. It is apparent that shorter times of roasting will benefit the material being treated to the extent that vanadium is rendered extractible. The materials may be roasted in contact with the atmosphere as the presence of oxygen is not deleterious. It is advantageous to have all of the materials in the roasting operation relatively finely divided as the reactions or physical modifications of the ore which take place in the present roasting operation go forward at a more rapid rate with finely divided materials although relatively coarse material can also be benefited.

Best results have been obtained when the proper temperature of roasting as discussed above produced incipient fusion of the mass. That is to say, the temperature of roasting should just begin to slightly sinter the ore, although any substantial amount of fusion or clinkering will reduce the vanadium recovery. Too high a fusion point also causes the vanadium recovery to be lower, and either too high or too low a fusion point will generally result in an increase of extraction reagent lost in the tails. If the material has too high a melting point, a flux, that is, a material which lowers the fusion point, may be added whereas if the mass has too low a melting point a material which raises the fusion point may be added. Such materials are preferably added in finely divided form. It has been found, however, that all fluxing materials are not suitable. Thus, the addition of substantial quantities of alkali halides such as sodium chloride appears to reduce the amount of extractible vanadium, although it is sometimes possible to employ small amounts usually in combination with other materials. This is probably for the reason that the melting points of alkali metal halides, in general, are so far below the melting point of the other constituents in the material being roasted that fusion tends to result before desirable reactions can take place. I have found, however, that alkaline earth metal halides are in general suitable. Because of their cheapness and availability calcium fluoride and calcium chloride will ordinarily be employed. Calcium chloride rather rapidly reduces the fusion point of the mass while calcium fluoride reduces the fusion point at a less rapid rate. Also additions of silica, in substantial amounts likewise reduce the fusion point. In general, alkaline earth oxides, such as calcium or barium oxide, or alkaline earth metal compounds which decompose to form the oxides during roasting such as the carbonates can be employed to increase the fusion point. No precise amounts of these fusion point modifying materials applicable to all vanadium bearing materials can be given as obviously the amounts and type of such fusion point modifying material will depend upon the particular characteristics of vanadium bearing material being treated. The general rule is to add alkaline earth metal halides or to add silica if the materials do not show incipient fusions at the optimum roasting temperature and to add alkaline earth oxides or their equivalents, if the vanadium bearing material clinkers to any substantial extent.

It is also of importance that a proper chemical balance be obtained. As to this chemical balance, I have found that the total calcium present calculated as CaO should be at least enough to give a 1 to 1 ratio of CaO to $R_2O_3$. The total calcium or other alkaline earth metal, even if present or added in the form of a halide is calculated as CaO. Vanadium extraction is rapidly improved to the extent that calcium is added up to this point, particularly if incipient fusion results at the roasting temperature above discussed. It is preferred, however, to have calcium present in excess of a 1 to 1 ratio of CaO to $R_2O_3$ as vanadium recovery is thereby increased, so long as the incipient fusion point remains close to the roasting temperature. I have also found that the amount of silica should be at least enough to provide a 3 to 1 molecular ratio of $SiO_2$ to $R_2O_3$ plus enough additional silica to provide a 1 to 1 molecular ratio of $SiO_2$ to CaO. That is to say, there should be enough silica present to provide a 3 to 1 molecular ratio of $SiO_2$ to $$\left(R_2O_3 + \frac{CaO}{3}\right)$$

A relatively large excess of silica over the amount required by this relation is desirable. Thus, loss of extraction agent in the tails decreases rapidly as silica is added up to the amount required by this relation and continues to decrease slowly as silica is added in amounts over that required by this relation up to a 3 to 1 ratio of $SiO_2$ to $R_2O_3+CaO$ and even more can be employed without deleterious effect except for dilution of the material being treated.

Additions of CaO, $CaF_2$, $CaCl_2$ or $CaCO_3$ or equivalent compounds of alkaline earth metals such as barium may be made to increase the equivalent CaO content. Adding a carbonate is entirely equivalent to adding an oxide both as to chemical balance and fusion point modification as the $CO_2$ thereof is driven off in reaching the roasting temperature. Thus, limestone is a convenient form for the addition of CaO although lime may be employed. The silica is preferably added in the form of sand although other forms of silica can be employed. Calcium fluoride can be added in the form of fluorspar or precipitated calcium fluoride while calcium chloride may be added in any convenient form.

In making additions to provide the correct chemical balance, the effect upon the fusion point should be taken into consideration. Some vanadium bearing materials may contain sufficient calcium and not enough silica, while others may contain sufficient silica and insufficient calcium while still others may require additions of both calcium and silica. The amounts of calcium and silica required to produce a 1 to 1 ratio of CaO to $R_2O_3$ and then at least a 3 to 1 ratio of $SiO_2$ to $$\left(R_2O_3 + \frac{CaO}{3}\right)$$

can be easily calculated from an analysis of the ore or slag. The fusion characteristics of the vanadium bearing material at 1800° F. can likewise be easily obtained and by remembering that $CaCl_2$ and $CaF_2$ or similar alkaline earth metal halides as well as silica tend to lower the fusion point and CaO or $CaCO_3$ or similar alkaline earth metal compounds tend to increase the fusion point, a desirable mixture can be readily approximated. Slight adjustments of the proportions of modifying ingredients can then be made until incipient fusion is produced at the optimum roasting temperature close to 1800°. Since relatively large excesses of CaO over a 1 to 1 ratio with respect to $R_2O_3$ can be tolerated and are, in fact advantageous and the same is true with respect to $SiO_2$ over a 3 to 1 ratio with respect to $$\left(R_2O_3 + \frac{CaO}{3}\right)$$

a great deal of leeway in securing a proper fusion point is provided.

From the above discussion it should be apparent that it is not necessary to add enough modifying materials to actually reach the optimum proportions described or to exactly produce the optimum incipient fusion point in order to increase vanadium recovery, as any additions which carry the composition of the ore or slag toward these optimum points, usually increase the vanadium recovery over that from the unmodified slag. It will further be apparent that the modifying materials added may comprise alkaline earth metal compounds or silica or a combination of both.

As a guide in approximating the incipient fusion point of an ore or slag with respect to roasting at 1800° without making an actual determination, it may be generally stated that: (a) large proportions of $SiO_2$ in the original material lower the incipient fusion point, (b) relatively large proportions of $R_2O_3$ particularly $Fe_2O_3$ raise the fusion point, (c) high $SiO_2$ content and low CaO as the oxide or carbonate and low $R_2O_3$ gives the lowest fusion point. As a guide in making proper additions both as to correcting the chemical balance and obtaining the proper fusion point, it may be generally stated that: (A) materials high in $SiO_2$ and relatively low in $R_2O_3$ can take small amounts of CaO as lime or calcium carbonate to increase the calcium content and raise the fusion point simultaneously, (B) as $R_2O_3$ becomes higher, and $SiO_2$ becomes lower, with the CaO content still low, a part of the calcium can be added as lime or carbonate and a part as $CaCl_2$ or $CaF_2$ to lower the fusion point, (C) if $R_2O_3$ is very high and the silica low, silica and $CaF_2$ or silica and a mixture of lime or calcium carbonate and $CaCl_2$ can be added, (D) in some intermediate cases where both the calcium and silica contents are only slightly low and the fusion point is substantially correct additions of both silica and calcium in the form of the oxide or carbonate may be desirable to obtain chemical balance and the correct fusion point.

As a specific example of an ore treated by the present invention a roscoelite containing about 1.75% vanadium or 3.1% $V_2O_5$ and analyzing approximately 1.1% CaO, 85% $SiO_2$, 5.6% $Al_2O_3$ and 0.6% $Fe_2O_3$ was roasted at 1800° F. This roasting temperature was found to give a vanadium recovery of 39% upon chlorination but the ore had a marked tendency to clinker indicating that the fusion point was too low. Chlorinating was carried on with a mixture of gases containing essentially sulphur dichloride and chlorine at a temperature of 350° C. The molecular proportions of this ore are approximately CaO—1, $R_2O_3$—3 and $SiO_2$—72, giving a molecular ratio of CaO to $R_2O_3$ of approximately 1 to 3 and a molecular ratio of $SiO_2$ to $(R_2O_3+CaO)$ of approximately 18 to 1. The fixed loss of chlorine in the tails was practically none. It is apparent that the ore was low in calcium but high in silicon, and that proper ratios of the various oxides could be obtained by adding calcium compounds.

It was found that very good results were produced by adding approximately 10% calcium carbonate, which is equivalent approximately to 5.6% calcium oxide, and 3% calcium chloride, which is equivalent approximately to 3.3% calcium oxide, or a total addition of CaO of approximately 8.9%. This produced a material containing approximately 10 parts CaO, 85 parts $SiO_2$ and 6 parts $Al_2O_3$ or a molecular ratio of CaO to $Al_2O_3$ of approximately 3 to 1 and a molecular ratio of $SiO_2$ to $(Al_2O_3+CaO)$ of approximately 6 to 1. Thus a large excess of CaO with respect to a 1 to 1 ratio with $R_2O_3$ and a large excess of $SiO_2$ with respect to a 3 to 1 ratio with $(R_2O_3+CaO)$ was present. The mixture had a fusion point such that very slight clinkering occurred with roasting at 1800° F. for two hours. Upon extraction of vanadium by chlorination with a mixture of gases containing $SCl_2$ and Cl at 350° C. a vanadium recovery of 79% was obtained and at 450° C. a recovery of 86% was obtained as contrasted with 39% recovery at 350° C. with the original ore. The loss of chlorine in the tails was in both cases approximately 0.1 pound per pound of vanadium recovered.

In order to illustrate the effect of an improper fusion point even when a good chemical balance has been effected, an amount of CaO in the form of lime substantially equivalent to the amount added in the above example, was mixed with the same ore. The ore was roasted at the same temperature and under the same condition but showed no signs of incipient fusion as the fusion point had been raised to too great an extent. Vanadium recovery with chlorination at 350° C. was 67% as contrasted with 79% when a proper fusion point was obtained. Loss of chlorine in the tails was, however, approximately two pounds per pound of vanadium recovered. Both the lower recovery and the increased loss of chlorine was apparently due to incomplete reaction of the added CaO because the incipient fusion point was slightly removed from the roasting temperature.

It has been found that leaching with a 5% solution of sulfuric acid at room temperature gives practically the same results in every instance as extraction by chlorination. The loss of reagent is, however, substantially greater. Recovery of vanadium with a hydrochloric acid leach of the same concentration gives substantially equivalent results. Mineral acids in general extract substantial amounts of materials other than vanadium whereas chlorination produces substantially pure vanadium. Increasing the temperatures of chlorination or the strength of the acid or temperature in acid leaching, in general, merely increases the loss of reagent either by loss in the tails or the amount of other materials taken into solution, without substantially increasing vanadium recovery and the same is true of leaching with an alkali metal carbonate. If the material being extracted has been brought to a proper chemical balance and a proper fusion point and roasted at the correct temperature, carbonate leaching also produces substantially the same results as acid leaching. However, if the material being leached has not been properly conditioned the vanadium recovery with carbonate leaching is substantially less than with chlorination or acid leaching.

In conditioning the ore above described it is apparent that $CaF_2$ in admixture with CaO could have been employed instead of $CaCl_2$ and CaO. A lesser amount of CaO and a greater amount of calcium halide would, however, have been necessary to produce the same fusion point.

As a specific example of treating slags, a slag from an electric furnace employed in producing ferro-vanadium containing approximately 1.25% vanadium or 2.2% $V_2O_5$, 8.5% CaO, 31.5% $SiO_2$, 1.1% $Fe_2O_3$, 41.7% $Al_2O_3$ and 0.5% $Mn_2O_3$. It will be noted that this material contained high amounts of $R_2O_3$, smaller amounts of $SiO_2$ and a substantial amount of CaO. The molecular proportions of this material are approximately CaO—1, $R_2O_3$—2.8 and $SiO_2$—3.5 giving a molecular ratio of CaO to $R_2O_3$ of approximately 1 to 2.8 and a molecular ratio of $SiO_2$ to $$\left(R_2O_3 + \frac{CaO}{3}\right)$$

of approximately 1.1 to 1. This slag, however, had an incipient fusion point somewhat above 1800° F. and required both chemical balancing and lowering of the fusion point. Roasting this ore at 1800° F. and chlorinating at 350° F. gave a vanadium recovery of 63%. It is apparent that more calcium and silicon are both necessary to produce maximum recovery of vanadium. Additions of $CaCO_3$ alone to this material in an amount equal to approximately 7 parts of CaO per one hundred parts of slag, even though the fusion point was thereby raised, somewhat improved vanadium recovery. An addition of 10 parts of $CaF_2$, which is approximately equivalent in calcium content to 7 parts CaO, to 100 parts of slag still further increased vanadium recovery although the fusion point was still too high and insufficient silica was present. The vanadium recovery under these conditions was approximately 79%. An addition of 10 parts of $CaF_2$ and 30 parts of $SiO_2$ increased the vanadium recovery by chlorination after roasting at 1800° F. to 82.7%.

In this mixture the molecular proportions are approximately CaO—1, $R_2O_3$—1.5 and $SiO_2$—3.6 giving a molecular ratio of CaO to $R_2O_3$ of approximately 1 to 1.5 and a molecular ratio of $SiO_2$ to $$\left(R_2O_3 + \frac{CaO}{3}\right)$$

of 2 to 1. The fusion point of this mixture was very nearly correct. A less expensive mixture of $CaCO_3$ and $CaCl_2$ could have been substituted for the $CaF_2$. Also, addition of still greater amounts of calcium compounds and silica balanced to retain the same fusion point with a molecular ratio of $SiO_2$ to $$\left(R_2O_3 + \frac{CaO}{3}\right)$$

at least equal to 3 to 1 and a molecular ratio of CaO to $R_2O_3$ of at least 1 to 1 produces a still greater vanadium recovery which may exceed 90%. Such additions of large amounts of modifying materials may, in some instances, be uneconomic as the costs of heating and extracting increased amounts of materials must be added to the costs of the modifying materials and the above example is given to illustrate the effects upon vanadium recovery of partially balancing the materials.

Chlorination of the unmodified slag after roasting at 1800° F. results in a net loss of chlorine fixed in the tails of approximately 4 to 5 pounds per one hundred pounds of slag treated. Altogether about 8 to 10 pounds of chlorine per one hundred pounds of slag remain in the tails but about half of the amount originally retained in the tails can usually be recovered by heating the tails and separating the chlorine from the evolved gases. By properly balancing the slag composition this net chlorine loss in the tails can be reduced to 0.2 pound per one hundred pounds of slag or less and this chlorine loss decreases as the ratio of $SiO_2$ to $(R_2O_3+CaO)$ increases up to a molecular ratio of about 3 to 1. Again acid leaching produces substantially the same vanadium recovery as chlorination but carbonate leaching produces very much lower vanadium recovery if chemical balance and fusion point are not correct.

The ore and slag of the above examples are merely illustrative, as the compositions and fusion points of various roscoelite ores and various slags will vary widely. Carnotite ore is in general similar to roscoelite except that it also contains uranium and radium but usually presents about the same problems as roscoelite. Brozas ores usually require the addition of both calcium compounds and silica to produce a chemical balance at the correct fusion point but the composition of this ore even from the same source also varies widely.

It is apparent that the vanadium occurs in the roasted materials in at least three forms: (1) Vanadium not extractible with any of the extraction agents; (2) vanadium extractible by chlorination and acid leaching but not by carbonate leaching, and; (3) vanadium extractible by all of the extraction agents. It is also apparent that proper chemical balancing of the material being roasted, a proper fusion point of the material, and a proper roasting temperature produce a maximum of (3), a minimum of (1) and very little, if any, of (2). Materials in which substantial amounts of (2) are present also produce increased amounts of acid or chlorine loss.

High silica and low calcium materials develop very little of (2) if the fusion point is correct, even if the vanadium recovery is low, while on the other hand high calcium and low silica materials develop substantial amounts of (2).

While applicant does not wish to be restricted to any precise theory, it is believed that the vanadium occurs in solid solution or in chemical combination with complex silicates as well as in simpler silicates and probably as calcium vanadates and may even be present to some extent as the oxide $V_2O_5$. The roasting temperature employed evidently causes compounds or at least crystalline structures to be formed or segregated out from which the vanadium is more easily extractible. The reactions necessary apparently take place most effectively if the material is at the incipient fusion point. If no fusion occurs effective contact between the various materials is apparently not secured while substantial fusion apparently results in an amorphous mass from which the vanadium is difficult to extract.

The proportions giving the maximum recovery favor the assumption that extraction is increased by the formation of the simpler silicates such as $CaO.SiO_2$ and $Al_2O_3.(SiO_2)_3$ which would correspond to a molecular ratio of $SiO_2$ to

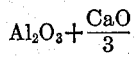

of 3 to 1 as against such complex silicates as $(CaO)_3.R_2O_3.(SiO_2)_3$ or $CaO.R_2O_3(SiO_2)_2$, etc. If it be assumed that vanadium is in solid solution in these compounds and more soluble in and more easily extractible from $CaO.SiO_2$ then the desirability for a molecular ratio of $CaO$ to $R_2O_3$ of at least 1 to 1 becomes apparent in order to provide a substantial amount of $CaO.SiO_2$. Vanadium appears to be extractible from calcium vanadates by chlorination and acid leaching but not by carbonate leaching. An excess of silica would tend to prevent the formation of such vanadates by combining with the calcium to form calcium silicate. Also, the presence of calcium vanadates and the extraction of vanadium therefrom would provide calcium to react with chlorine to form a non volatile chloride or to react with sulfuric acid to form insoluble calcium sulfate. This would account for loss of extraction reagent in the tails when the ratio of $SiO_2$ to $R_2O_3+CaO$ is low. The compounds or crystalline structures which tend to form when a properly modified ore or slag is roasted are not definitely known because of the complexity of the chemistry involved, but it is believed that actions at least similar to those assumed above take place.

While I have described preferred embodiments of my invention, it is understood that the invention is not to be limited except by the scope of the following claims.

I claim:

1. The process of increasing the extractable vanadium in vanadium bearing materials which contain as components a member from the group composed of silica and alkaline earth metal compounds, which comprises, adding an amount of at least one of said components which will bring the temperature of incipient fusion of said material between approximately 1700° to 1900° F., and roasting the resulting material at said temperature of incipient fusion so as to increase the content of vanadium which is extractable by weak acidic solutions or chlorination.

2. The process of increasing the extractable vanadium in vanadium bearing materials of the type including oxygen and compounds of metals forming oxides in which the metal is trivalent and which contain as components a member from the group composed of silica and alkaline earth metal compounds, which comprises, adding an amount of at least one of said components which will bring the temperature of incipient fusion of said material between approximately 1700° to 1900° F., and roasting the resulting material at said temperature of incipient fusion so as to increase the content of vanadium which is extractable by weak acidic solutions or chlorination.

3. The process of increasing the extractable vanadium in vanadium bearing materials of the type including oxygen and compounds of metals forming oxides in which the metal is trivalent and which contain as components a member from the group composed of silica and alkaline earth metal compounds, which comprises, adding an amount of at least one of said components which will bring the temperature of incipient fusion of said material between approximately 1700° and 1900° F., selecting the added components so as to approximate at least one to one molecular ratio of alkaline earth metal oxide to $R_2O_3$ and a three to one molecular ratio of $SiO_2$ to

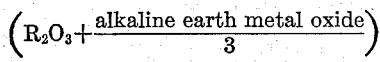

where all of the materials present are calculated as oxides and R represents said metals forming oxides in which the metal is trivalent and roasting the resulting material at said temperature of incipient fusion so as to increase the content of vanadium which is extractable by weak acidic solutions or chlorination.

4. The process of increasing the extractable vanadium in vanadium bearing materials which contain relatively large amounts of silica, which comprises, adding an amount of an alkaline earth metal compound which will bring the temperature of incipient fusion of said material between approximately 1700° to 1900° F., and roasting the resulting material at said temperature of incipient fusion so as to increase the content of vanadium which is extractable by weak acidic solutions or chlorination.

5. The process of increasing the extractable vanadium in vanadium bearing materials of the type including oxygen and compounds of metals forming oxides in which the metal is trivalent and which contain relatively large amounts of silica, which comprises, adding an amount of alkaline earth metal compounds which will bring the temperature of incipient fusion of said material between 1700° to 1900° F. and approximate at least a one to one ratio of alkaline earth metal oxide to $R_2O_3$ where all of the materials present are calculated as oxides and R represents said metals forming oxides in which the metal is trivalent, and roasting the resulting material at said temperature of incipient fusion so as to increase the content of vanadium which is extractable by weak acidic solutions or chlorination.

6. The process of increasing extractable vanadium in vanadium bearing materials which contain silica and relatively large amounts of alkaline earth metal compounds, which comprises, adding an amount of silica which will bring the temperature of incipient fusion of said material between approximately 1700° to 1900° F., and roasting the resulting material at said temperature of incipient fusion so as to increase the content of vanadium which is extractable by weak acidic solutions or chlorination.

7. The process of increasing the extractable vanadium in vanadium bearing materials of the type including oxygen and compounds of metals forming oxides in which the metal is trivalent and which contain silica and relatively large amounts of alkaline earth metal compounds, which comprises, adding an amount of silica which will bring the temperature of incipient fusion of said material between approximately 1700° to 1900° F. and approximate at least a three to one molecular ratio of $SiO_2$ to $$\left(R_2O_3 + \frac{\text{alkaline earth metal oxide}}{3}\right)$$

where all of the materials present are calculated as oxides and R represents said metals forming oxides in which the metal is trivalent, and roasting the resulting material at said temperature of incipient fusion so as to increase the content of vanadium which is extractable by weak acidic solutions or chlorination.

8. The process of recovering vanadium from vanadium bearing materials of the type including oxygen and compounds of metals forming oxides in which the metal is trivalent and which contain as components a member from the group composed of silica and calcium compounds, which comprises, adding an amount of at least one of said components which will bring the temperature of incipient fusion of said material between approximately 1700° to 1900° F., selecting the added components so as to approximate at least a one to one molecular ratio of CaO to $R_2O_3$ and a three to one molecular ratio of $SiO_2$ to $$\left(R_2O_3 + \frac{CaO}{3}\right)$$

where all of the materials present are calculated as oxides and R represents said metals forming oxides in which the metal is trivalent, roasting the resulting material at said temperature of incipient fusion so as to increase the content of vanadium which is extractable by weak acidic solutions or chlorination and extracting said vanadium from the roasted material.

9. The process of recovering vanadium from vanadium bearing materials of the type including oxygen and compounds of metals forming oxides in which the metal is trivalent and which contain as components a member from the group composed of silica and calcium compounds, which comprises, adding an amount of at least one of said components which will bring the temperature of incipient fusion of said material between approximately 1700° to 1900° F., selecting the added components so as to approach a one to one molecular ratio of CaO to $R_2O_3$ and a three to one molecular ratio of $SiO_2$ to $$\left(R_2O_3 + \frac{CaO}{3}\right)$$

where all of the materials present are calculated as oxides and R represents said metals forming oxides in which the metal is trivalent, roasting the resulting material at said temperature of incipient fusion so as to increase the content of vanadium which is extractable by weak acidic solutions or chlorination, and extracting said vanadium by chlorination with a mixture of gases consisting essentially of sulphur dichloride and chlorine at a temperature of approximately 350° C.

10. The process of increasing the extractable vanadium in vanadium bearing materials which contain as components a member from the group composed of silica and alkaline earth metal compounds which comprises, adding an amount of at least one of said components which will bring the temperature of incipient fusion of said material to approximately 1800° F., and roasting the resulting materials at said temperature of incipient fusion so as to increase the content of vanadium which is extractable by weak acidic solutions or chlorination.

11. The process of increasing the extractable vanadium in vanadium bearing materials of the type including oxygen and compounds of metals forming oxides in which the metal is trivalent and which contain as components a member from the group composed of silica and calcium compounds, which comprises, adding an amount of at least one of said components which will bring the temperature of incipient fusion of said material to approximately 1800° F., selecting the added components so as to approximate at least a one to one molecular ratio of CaO to $R_2O_3$ and a three to one molecular ratio of $SiO_2$ to $$\left(R_2O_3 + \frac{CaO}{3}\right)$$

where all of the materials present are calculated as oxides and R represents said metals forming oxides in which the metal is trivalent, and roasting the resulting material at said temperature of incipient fusion so as to increase the content of vanadium which is extractable by weak acidic solutions or chlorination.

12. The process of recovering vanadium in vanadium bearing materials of the type including oxygen and compounds of metals forming oxides in which the metal is trivalent and which contain as components a member from the group composed of silica and calcium compounds, which comprises, adding an amount of at least one of said components which will bring the temperature of incipient fusion of said material to approximately 1800° F., selecting the added components so as to approximate at least a one to one molecular ratio of CaO to $R_2O_3$ and a three to one molecular ratio of $SiO_2$ to $$\left(R_2O_3 + \frac{CaO}{3}\right)$$

where all of the materials present are calculated as oxides and R represents said metals forming oxides in which the metal is trivalent, roasting the resulting material at said temperature of incipient fusion so as to increase the content of vanadium, and extracting said vanadium by chlorination with a mixture of gases consisting essentially of sulphur dichloride and chlorine at a temperature of approximately 350° C.

13. The process of increasing the extractable vanadium in vanadium bearing materials which contain as components a member from the group composed of silica and alkaline earth metal compounds, which comprises, adding an amount of at least one of said components which will bring the temperature of incipient fusion of said material between approximately 1700° to 1900° F., roasting the resulting material at said temperature of incipient fusion so as to increase the content of vanadium which is extractable by weak acidic solutions or chlorination, and extracting vanadium from the roasted material by treating the same at an elevated temperature with a mixture of gases consisting essentially of sulphur dichloride and chlorine.

LESLIE G. JENNESS.